United States Patent [19]

Brophy et al.

[11] Patent Number: 5,628,360
[45] Date of Patent: May 13, 1997

[54] ADJUSTABLE AXIAL SEAL PLATES FOR ROTARY REGENERATIVE AIR PREHEATERS

[75] Inventors: Mark E. Brophy; Glenn D. Mattison, both of Wellsville, N.Y.

[73] Assignee: ABB Air Preheater, Inc., Wellsville, N.Y.

[21] Appl. No.: 604,646

[22] Filed: Feb. 21, 1996

[51] Int. Cl.⁶ .................................................. F23L 15/02
[52] U.S. Cl. ............... 165/9; 165/DIG. 21; 165/DIG. 20
[58] Field of Search .................... 165/9, DIG. 20, 165/DIG. 21, DIG. 22, DIG. 23, DIG. 24, DIG. 26

[56] References Cited

U.S. PATENT DOCUMENTS

| 2,670,934 | 3/1954 | Hammond et al. | 165/DIG. 21 X |
| 3,216,488 | 11/1965 | Conde | 165/DIG. 21 X |
| 3,373,797 | 3/1968 | Nyberg | 165/DIG. 22 X |
| 4,024,907 | 5/1977 | Brzytwa | 165/9 |

FOREIGN PATENT DOCUMENTS

| 0850738 | 10/1960 | United Kingdom | 165/9 |

*Primary Examiner*—John Rivell
*Assistant Examiner*—Christopher Atkinson
*Attorney, Agent, or Firm*—Chilton, Alix & Van Kirk

[57] ABSTRACT

An arrangement is provided in an air preheater for mounting and adjusting the axial seal plates in relation to the rotor using a reduced number of adjustable mountings and replacing the remaining adjustable mountings with adjustable compression stops. These adjustable compression stops engage but require no attachment to the axial seal plates. This reduces the work necessary in the limited space between the air preheater housing and the axial seal plates thereby reducing costs and facilitating installation and replacement.

4 Claims, 6 Drawing Sheets

5,628,360

ADJUSTABLE AXIAL SEAL PLATES FOR ROTARY REGENERATIVE AIR PREHEATERS

BACKGROUND OF THE INVENTION

The present invention relates to rotary regenerative air preheaters which employ axial seals and axial seal plates located between the rotor and the rotor housing and dividing the air preheater into a gas sector and one or more air sectors. Specifically, the invention relates to a novel arrangement for mounting and adjusting the axial seal plates.

A rotary regenerative air preheater transfers sensible heat from the flue gas leaving a boiler to the entering combustion air through regenerative heat transfer surface in a rotor which turns continuously through the gas and air streams. The rotor which is packed with the heat transfer surface is supported through a lower bearing at the cold end of the air preheater and guided through a bearing assembly located at the top hot end. The rotor is divided into compartments by a number of radially extending plates referred to as diaphragms. These compartments are adapted to hold modular baskets in which the heat transfer surface is contained. The air preheater is divided into a flue gas side or sector and one or more combustion air sides or sectors by sector plates. Flexible radial seals on the rotor, usually mounted on the top and bottom edges of the diaphragms, are in close proximity to these sector plates and minimize leakage of gas and air between sectors. Likewise, axial seal plates are mounted on the housing between the housing and the periphery of the rotor between the air and gas sectors. These axial seal plates cooperate with flexible axial seals mounted on the outer ends of the diaphragms. These axial seals and seal plates together with the radial seals and sector plates effectively separate the air and flue gas streams from each other.

For maximum effectiveness, the axial sealing plates must be adjustable during operation to accommodate for thermal expansion and wear of parts. The prior art practice has been to use an arrangement of four adjusters, referred to as canister-type adjusters, which are each attached to the housing and to the axial seal plated, one in the proximity of each of the four corners of the axial seal plate and move the axial seal plate inward and outward in the radial direction. Each adjuster requires a mounting box or canister, several grade plates, a threaded and machined adjuster rod, shear bolt means to tie the adjuster rod to the axial seal plate plus an assortment of nuts and bolts. This is a somewhat expensive device primarily because of the cost to manufacture the adjustor rod. In addition, this adjuster is difficult to install and replace because it must be connected to both the housing and the axial seal plate and there is limited access available to the axial seal plate.

SUMMARY OF THE INVENTION

The present invention provides an arrangement of means in an air preheater for mounting and adjusting axial seal plates using a reduced number of adjustable mountings and replacing the remaining adjustable mountings with adjustable compression stops which engage but are not attached to the axial seal plates. This reduces cost and facilitates installation.

DESCRIPTION OF THE PREFERRED EMBODIMENTS

Figure 1:
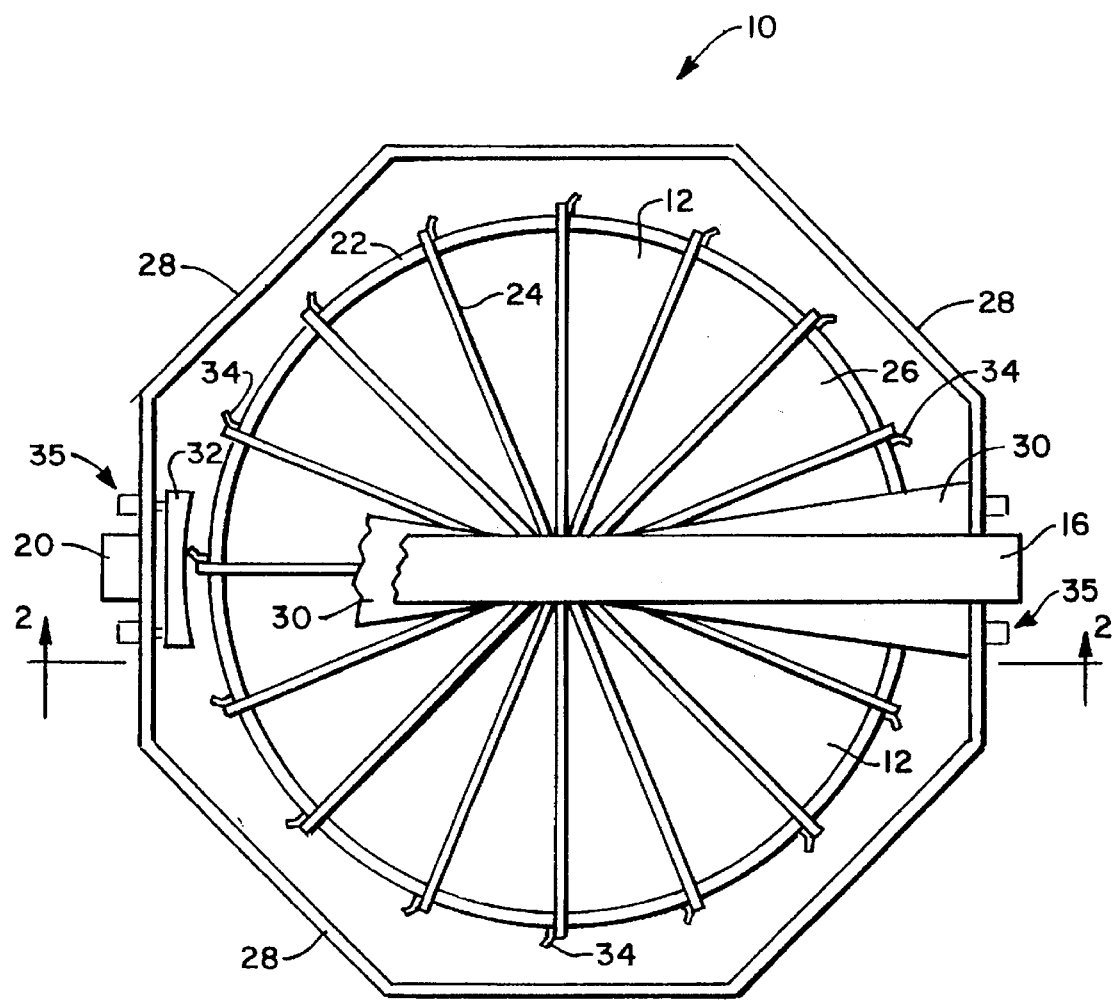
FIG. 1 is a top plan view of a typical rotary regenerative air preheater with the upper hot end center section removed for clarity and illustrating the axial seal plates mounted in position.
Figure 2:
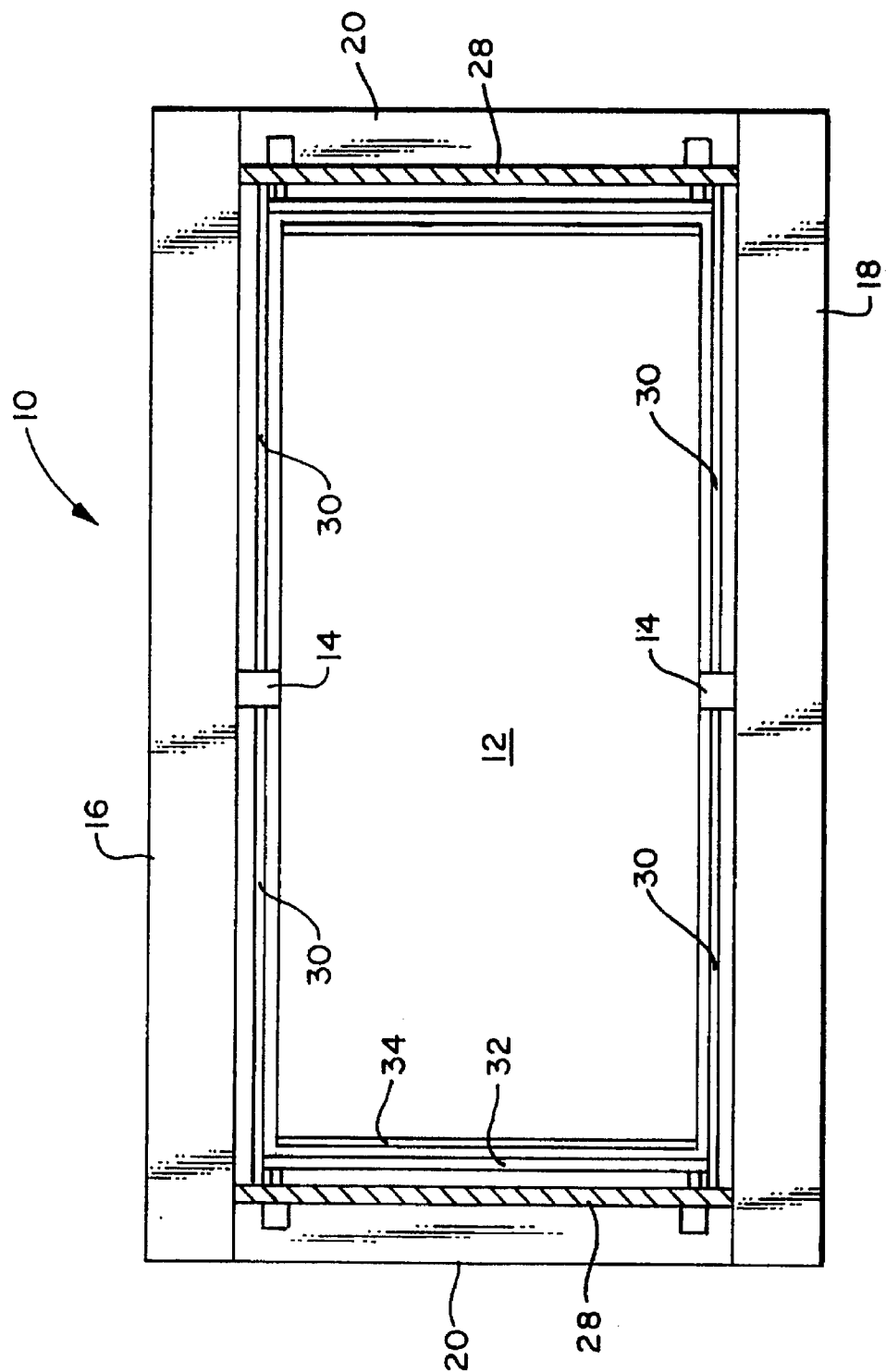
FIG. 2 is an elevation view in cross section of the air preheater of FIG. 1.

In order to understand and appreciate the present invention, reference will first be made to FIGS. 1 to 3 which illustrate the general environment of the invention and the prior means for mounting and adjusting the axial seal plates of an air preheater. FIGS. 1 and 2 depict a top plan view and a vertical cross-section view respectively of an air preheater 10. The rotor 12 is mounted on the shaft 14 and supported between the hot end center section 16 and the cold end center section 18. The hot end center section 16 is supported from the cold end center section 18 by the pedestals 20 on each end of these center sections 16 and 18. The rotor 12 comprises an outer rotor shell 22 and diaphragms plates 24 dividing the rotor into a plurality of compartments 26. As is conventional, modular heat exchange baskets would be loaded into the compartments 26.

Mounted on the top and bottom of the structure and usually attached to the sides of the center sections would be the conventional flue gas and air inlet and outlet connecting plate duct assemblies (not shown) which form the connection and transition between the rectangular ducts and the circular air preheater. Mounted between the hot and cold end center sections 16 and 18 and around the rotor 12 are the vertical housing panels 28 which form the rotor housing. Mounted adjacent to the upper and lower ends of the rotor 12 are the conventional sector plates 30 which divide the air preheater into a flue gas side or sector and an air side or sector in a known manner. Although not shown, radial seals which are normally attached to the upper and lower edges of the diaphragm plates 24 interact with the sector plates 30 to prevent or reduce the intermixing of the air and flue gas. Also, circumferential bypass seals which are not shown would be provided between the rotor and the housing to prevent the air and flue gas from flowing around the outside of the rotor. These are usually located around both the bottom and top edges of the rotor.

FIGS. 1 and 2 also show the axial sealing means extending in the axial direction at the periphery of the rotor between the gas side and air side. This sealing means comprises the axial seal plates 32 and the axial seals 34. The axial seal plates 32 are mounted from the vertical housing panels 28 and adjustably positioned in the proximity of the rotor periphery. Mounted on the rotor and usually on the outer ends of the diaphragm plates 24 are the flexible axial seals 34. These flexible axial seals 34 are in close proximity to the axial seal plates 32 thereby minimizing the amount of fuel gas and air from flowing circumferentially into the wrong sector.

The present invention relates to the mounting of these axial seal plates 32 from the vertical housing panels 28. FIGS. 1 and 2 illustrate the prior art type of mounting in general while FIGS. 3 and 4 illustrate such mountings and their arrangement in detail. These prior art types of mountings are employed in the present invention along with other new positioning means in a unique arrangement so the description of the details of the prior art is relevant to the present invention.

Figure 3:
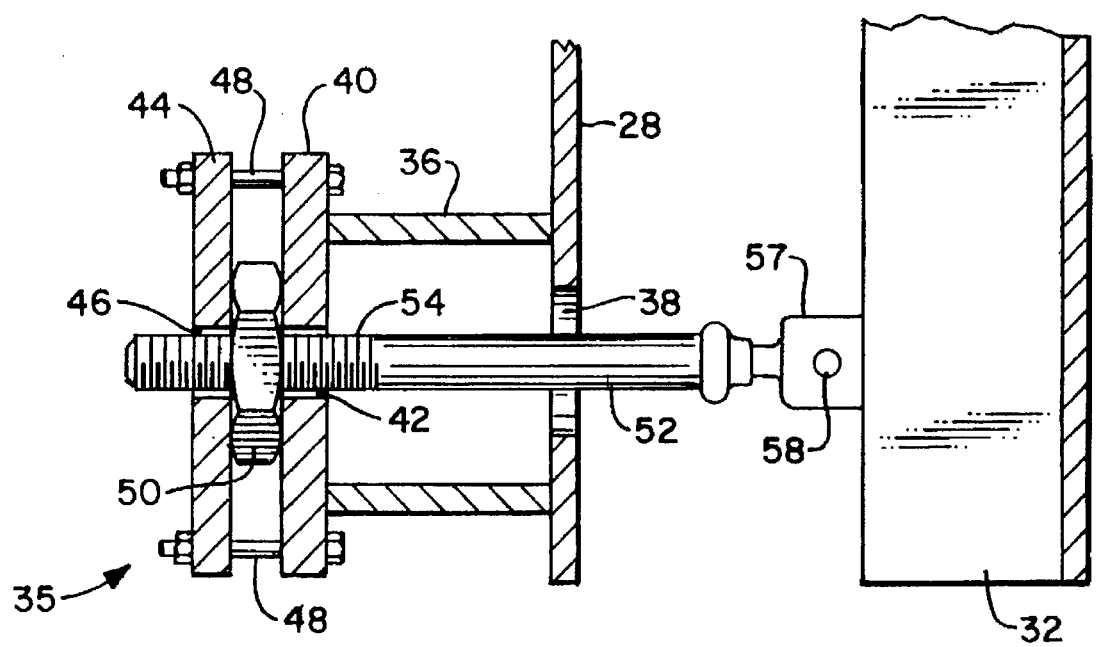
FIG. 3 is a section view taken along line 3—3 of FIG. 4 illustrating the details of one of the prior art canister-type adjustable mountings.
Figure 4:
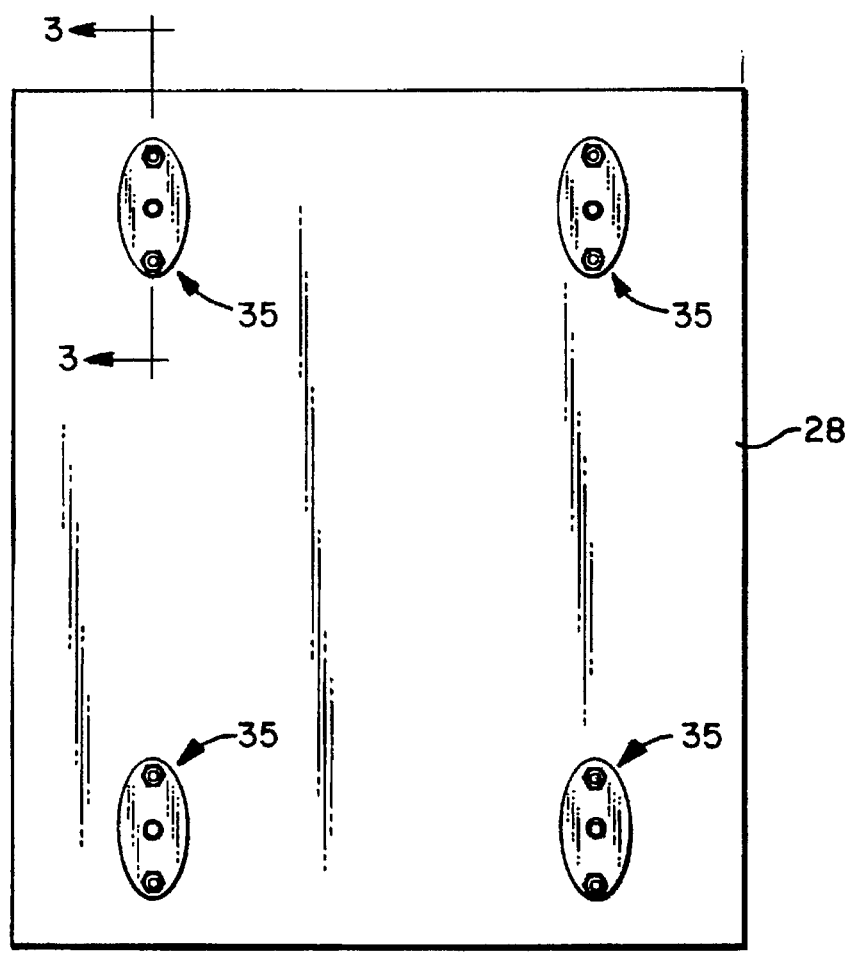
FIG. 4 is an elevation view of the external face of one of the side panels illustrating the arrangement of prior art adjusters.

Referring first to FIG. 3, the prior art adjustable mounting means generally designated 35, which is commonly referred to as a canister-type adjuster, comprises a canister 36 which is basically a box welded to a vertical housing panel 28 around an aperture 38. Welded to the outer end of the canister 36 is a guide plate 40 having an aperture 42. Located outwardly of the guide plate 40 is a second guide plate 44 having an aperture 46 which is bolted to the first guide plate 40 by the bolts 48. Clamped between the two guide plates 40 and 44 is a hex nut 50 which can be turned when the bolts 48 are loosened and which is held tightly in position when the bolts 48 are tightened. Threaded through the hex nut 50 and attached to the axial seal plate 32 is an adjuster rod 52. This rod is threaded at 54 such that the rod will move axially with respect to the panel 28 and with respect to the rotor 12. The rod 52 is attached to the axial seal plate 32 by means of a sheer pin. In the illustrated arrangement, the fitting 57 on the end of the rod 52 is attached to a post 56 extending from the axial seal plate 32 by the sheer pin 58 extending through holes in the post 56 and fitting 57 although other specific arrangements can be used. Therefore, turning the hex nut 50 moves the axial seal plate 32 either toward or away from the rotor 12. As shown in the drawings, there are canister-type adjusters 35 in each of the four corners of the axial seal plate 32.

Because the adjustor rod 52 has a machined fitting 57 on the end, the rod is comparatively expensive. Also, there is only a very limited space between the panel 28 and the axial seal plate 32 in which to maneuver to attach the rod to the axial seal plate. This makes installation and removal difficult and there are four such connections to complete. Therefore the present invention replaces two of the four adjustable mounting means with adjustable compression stops which are less expensive and easier to install and yet will accurately position the axial seal plate when used in conjunction with the remaining two adjustable mountings means.

Figure 6:
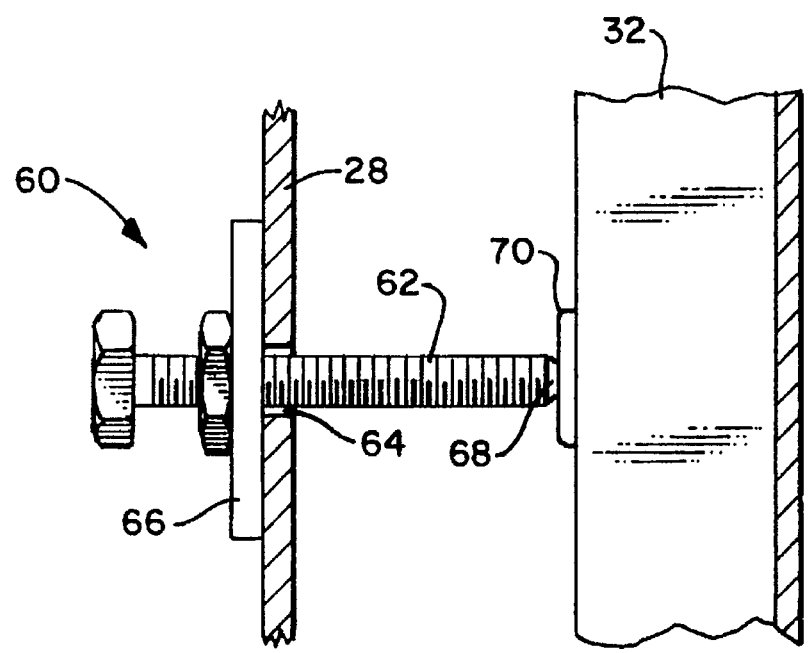
FIG. 6 is a detailed section view of one of the adjustable stops of the present invention taken along line 6—6 of FIG. 7.
Figure 8:
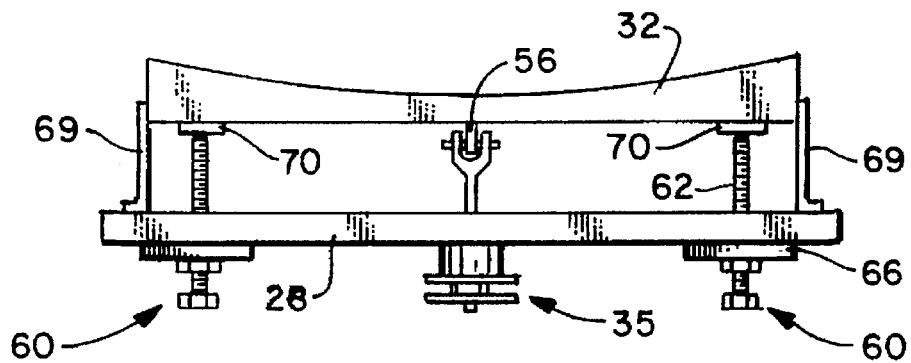
FIG. 8 is a top view of the arrangement of FIG. 7.
Figure 7:
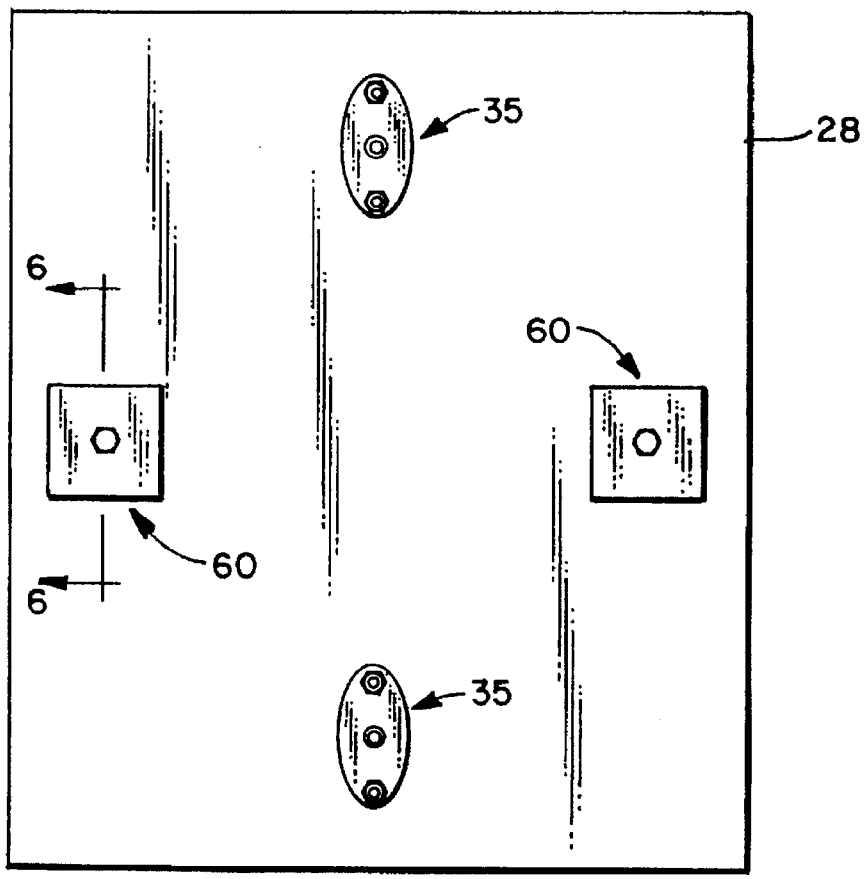
FIG. 7 is an elevation view of the external face of one of the side panels similar to FIG. 4 but illustrating the arrangement of canister-type adjustable mountings and adjustable stops of the present invention.
Figure 9:
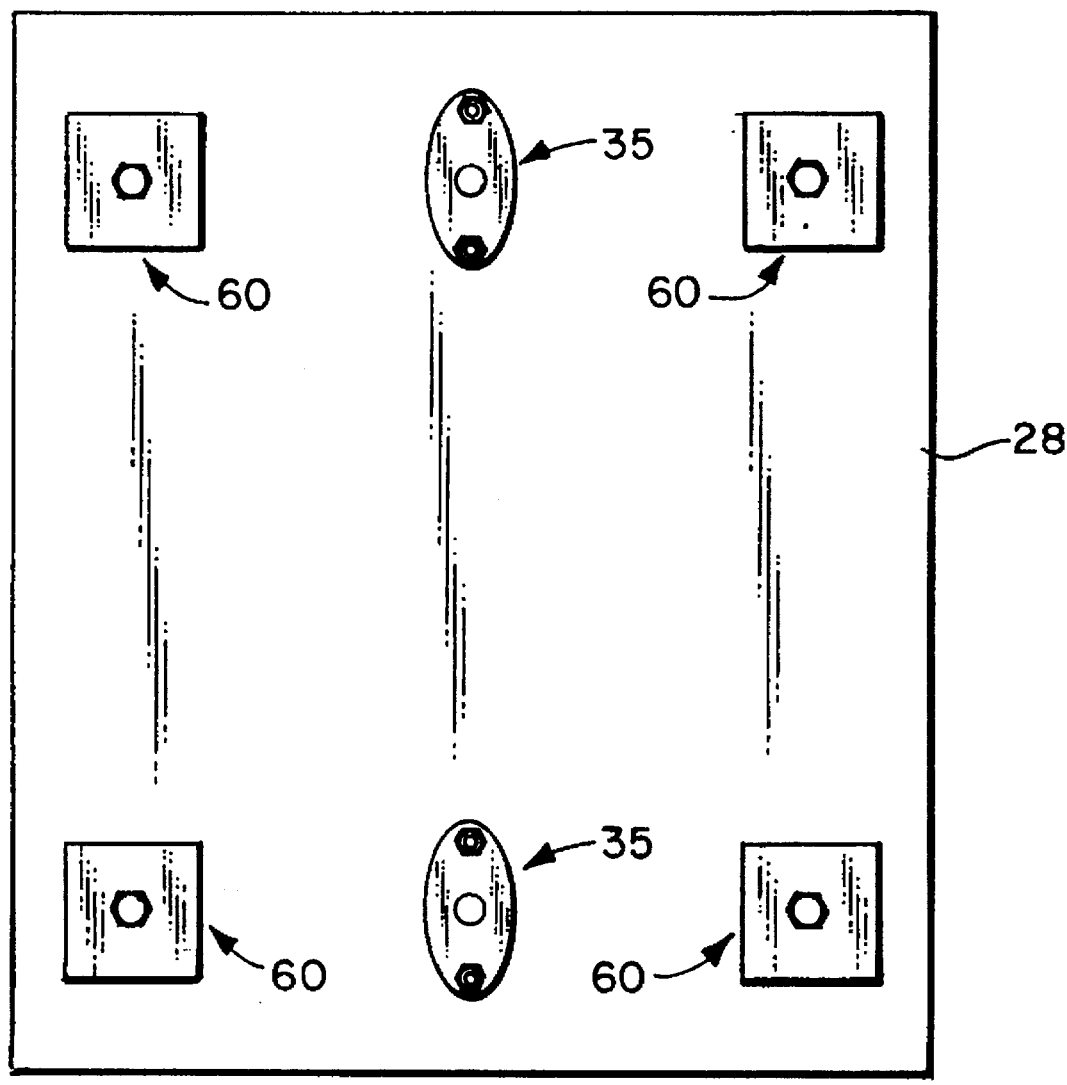
FIG. 9 is a modification of the present invention showing a different arrangement of the adjustable stops.

Referring to FIGS. 6, 7 and 8, the two remaining adjustable mounting means 35 are moved to the centerline of the axial seal plate 32. The adjustable mounting means now mount the axial seal plate and are used to position the centerline of the axial seal plate with respect to the rotor 12. Each of the adjustable compression means generally designated 60 comprises an adjustable bolt 62 which extends through a hole 64 in the panel 28 and is threaded through a nut 58 welded to the reinforcement plate 66 which is welded to the panel 28. The end 68 of the bolt 62 engages (contacts but is not attached to) a contact pad 70 welded to the axial seal plate 32. It can be seen particularly in FIG. 8 that the two adjustable bolts 62 located on opposite sides of the centerline function as push rods or stops for the canister-type adjustable mounting means 35 to pull against thereby placing the bolts 62 in compression. Therefore, the canister-type adjusters 35 are first adjusted to accurately space the centerline of the axial seal plate 32. Then, the adjustable compression means 60 are adjusted to accurately space the edges of the axial seal plate. An alternative arrangement is depicted in FIG. 9 where there are four adjustable compression means 60, one at each corner of the axial seal plate 32, instead of just two as in FIG. 7. Static seals 69 are welded to and between the axial seal plate and the panel 28 to lock the position of the axial seal plate after adjustment. These static seals 69 extend the full height of the axial seal plates and prevent gas flow behind the axial seal plate.

Figure 5:
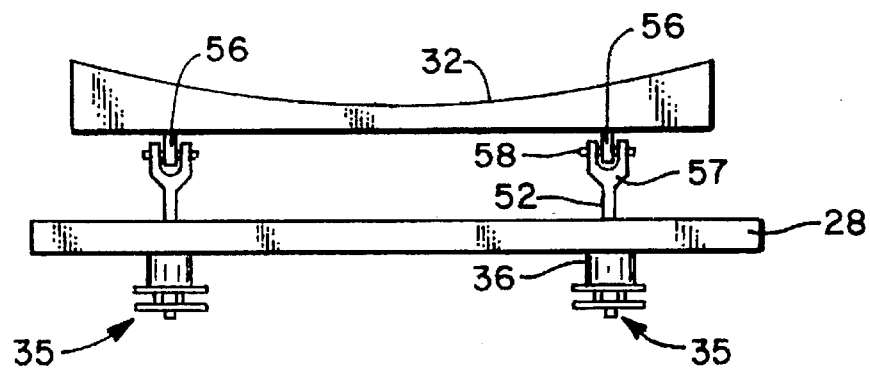
FIG. 5 is a top view of the FIG. 4 arrangement.

The canister-type adjusters 35 are actually used to mount the axial seal plates as well as move or adjust them inward or outward. In the present invention, these are located only on the centerline of the axial seal plates. On the other hand, the adjustable compression means 60 are not attached to and do not mount the axial seal plate but only function as push rods or stops. They can force the axial seal plates inward but they cannot pull them outward. One of the advantages is that the adjustable compression means 60 are less complicated and less expensive. The other advantage relates to the ease of installation and removal. As can be seen primarily in FIGS. 5 and 8, there is not much space between the panels 28 and the axial seal plates for access to make the connection between the rods 52 to the posts 56. In the present invention, there are only two rather than four canister type adjustable mountings thereby reducing both cost and installation time. The adjustable compression means 60 do not require any attachment to the axial seal plate.

We claim:

1. In a rotary regenerative air preheater including a rotor, a plurality of housing panels surrounding said rotor and at least one axial seal plate having an axial centerline mounted on one of said housing panels between said one housing panel and said rotor, means adjustably mounting said axial seal plate on said one housing panel comprising:

a. a pair of threaded mounting rods spaced apart along said centerline and extending through said one housing panel toward said axial seal plate and threaded through threaded adjusting means rotatably attached to said one housing panel whereby said rod may be moved toward and away from said rotor by rotating said threaded adjusting means;

b. means attaching said rod to said axial seal plate along said centerline whereby said centerline of said axial seal plate moves toward or away from said rotor when said rod is moved;

c. adjustable stop means located on either side of said centerline engaging said axial seal plate, said adjustable stop means being rotatably threaded to said housing panel whereby said adjustable stop means may be moved toward and away from said rotor thereby providing adjustable stops for said axial seal plate on both sides of said centerline.

2. In a rotary regenerative air preheater including a rotor, a plurality of housing panels surrounding said rotor and at least one axial seal plate having an axial centerline mounted on one of said housing panels between said one housing panel and said rotor, means adjustably mounting said axial seal plate on said one housing panel comprising:

a. a pair of mounting rods spaced apart along said centerline and extending between said axial seal plate and said one housing panel;

b. means attaching each of said mounting rods to said axial seal plate along said centerline;

c. adjustable means attaching each of said mounting rods to said housing panel whereby said mounting rods and said centerline of said axial seal plate may be moved toward and away from said rotor;

d. adjustable stop means located on either side of said centerline engaging said axial seal plate, said adjustable stop means adjustably mounted to said housing panel whereby said adjustable stop means may be moved toward and away from said rotor thereby providing adjustable stops for said axial seal plate on both sides of said centerline.

3. In a rotary regenerative air preheater as recited in claim 2 wherein said adjustable stop means comprise one adjustable stop means on each side of said centerline.

4. In a rotary regenerative air preheater as recited in claim 2 wherein said adjustable stop means comprise two adjustable stop means on each side of said centerline.

* * * * *